United States Patent [19]

Vanzant et al.

[11] 4,304,317

[45] Dec. 8, 1981

[54] METHOD AND APPARATUS FOR CONVERTING TRANSFER CASES FOR FOUR-WHEEL DRIVE VEHICLES

[76] Inventors: Karol W. Vanzant, 1518 Freeman, Santa Ana, Calif. 92706; Teddy L. Vanzant, 3060 Kips Korner, Norco, Calif. 91760

[21] Appl. No.: 163,228

[22] Filed: Jun. 26, 1980

[51] Int. Cl.³ ............................................. B60K 17/34
[52] U.S. Cl. ...................................... 180/247; 74/713; 180/250
[58] Field of Search ............... 180/247, 248, 249, 250, 180/70 R; 74/713, 711, 710.5, 710

[56] References Cited

U.S. PATENT DOCUMENTS

| | | |
|---|---|---|
| 2,173,044 | 9/1939 | Ruggles . |
| 2,329,916 | 9/1943 | Lamb .................................. 180/247 |
| 2,397,587 | 4/1946 | Armantrout . |
| 2,699,852 | 1/1955 | Cost ..................................... 180/250 |
| 2,971,595 | 2/1961 | Fabere . |
| 3,848,691 | 11/1974 | Dolan .................................. 180/250 |
| 4,169,394 | 10/1979 | Estrada ................................ 74/713 |

OTHER PUBLICATIONS

"203 Free Wheeler" (published flier by Offroad Marketing Corp.).

Primary Examiner—John P. Silverstrim
Attorney, Agent, or Firm—Gausewitz, Carr, Rothenberg & Edwards

[57] ABSTRACT

A method and apparatus for modifying and converting full-time four-wheel drive vehicle transfer cases to adapt them for optional two-wheel drive operation are described. A gear arrangement is provided for locking the main drive shaft from the transmission to the rear output gear of the transfer case, while permitting the differential cage of the transfer case to be engaged or disengaged with a forward drive gear for the front wheels, as desired.

15 Claims, 6 Drawing Figures

METHOD AND APPARATUS FOR CONVERTING TRANSFER CASES FOR FOUR-WHEEL DRIVE VEHICLES

BACKGROUND OF THE INVENTION

This invention relates to a method and apparatus for modifying and converting full-time four-wheel drive vehicles for optional two-wheel drive operation.

Mechanisms for equipping motor vehicles for four-wheel drive operations are well known. Typically, the drive shaft from the transmission of the vehicle is connected to a transfer case which distributes power to two output shafts, one to the rear axle and wheels and one to the front. For vehicles designed to operate only in rough offroad terrain, undifferentiated power to the front and the rear output shafts is acceptable; that is, the transfer case gearing can be used in fixed relationship to drive the front and rear axles at the same speed.

An undifferentiated drive mode for the transfer case is, however, unsuitable for the vast majority of uses, because for highway driving it is undesirable to force both axles to rotate at identical speeds. Forcing such performance may cause excessive tire wear, build up undesirable stresses in the drive chain, detract from fuel efficiency, make cornering unstable or difficult, and create other handling and safety problems. For reasons similar to that for using a differential on each axle to permit differentiated drive to the left and right wheels, it is thus also desirable to provide differentiated power to the front and rear axles. To achieve this, differential gearing is provided in the transfer case to permit the front and rear output shafts to be driven at different speeds in accordance with the relative demands of the two axles. (Differential gears are, of course, also provided for the front and rear axles to permit the left and right wheels of each axle to receive differentiated power distribution and rotate at different speeds.)

One such prior art transfer case is shown and described in U.S. Pat. No. 3,848,691 to Dolan, issued Nov. 19, 1974, which is incorporated herein by reference. Therein is shown a transfer case with a differential which can be locked or unlocked to prevent or permit rotation of the pinion gears, depending on whether the operator desires locked four-wheel drive operation (with the front and rear axles rotating at the same speed) or differentiated four-wheel drive operation (with the front and rear axles subject to different speeds). This type of transfer case has been widely adopted and used in hundreds of thousands, or millions, of four-wheel drive vehicles that are still in service. However, it is subject to a substantial deficiency relative to the need for fuel-efficient motor vehicles, namely, it is incapable of use for two-wheel drive operation. Given that the vast majority of four-wheel drive vehicles operate a great deal of the time in cities or on highways where four-wheel drive is unnecessary, it is extremely desirable to be able to convert them for optional two-wheel drive operation, since this can improve fuel efficiency by as much as 30% in some circumstances.

It is known to adapt the front wheels of four-wheel drive vehicles with optional locking-unlocking hubs to disengage the wheels from the front axle, when desired. By allowing the front wheels to "free-wheel", energy can be saved. These hubs, however, cannot be disengaged when used with a transfer case in differential mode of operation, because under such mode all, or substantially all, the power will be delivered to the front axle, which will simply spin without turning the disengaged front wheels. Since the differential gearing of the transfer case will deliver virtually no power to the rear axle, the vehicle will be immobilized.

On the other hand, it is possible to disengage the front wheels from their axle if the transfer case is operated in locked mode, so that equal rotation is imparted to both the forward and rear output shafts. This, however, is highly inefficient since a substantial portion of engine power will be wasted in turning the front output shaft, differential, and front axle, even though they perform no power function when the front wheel hubs are disengaged.

There is thus a great need for an inexpensive method and means for converting certain full-time four-wheel drive vehicles for optional two-wheel drive operation, and it is an object of the present invention to provide a method and means for such conversions. It is a further object to provide a method and means which are relatively easy and fast to employ by anyone of ordinary skill in the art without the necessity for expensive and complicated tools or equipment. These and other objects will be apparent from the following description of the invention.

SUMMARY OF THE INVENTION

This invention contemplates a method and means for retrofitting or modifying and adapting a full-time four-wheel drive vehicle so that it can be used optionally for two-wheel drive operation. The invention is used in connection with conventional four-wheel drive vehicles having transfer cases of the type which are designed to permit differentiated power transmission to the front and rear axles. The differential means is modified by removing the pinion gears and installing a gear locking means to lock the main drive shaft of the transfer case to the rear output gear so that undifferentiated power is transmitted to the rear axle of the vehicle.

The method and means of the invention may also include installing front wheel locking-unlocking hubs which can be unlocked to permit the front wheels to operate in a free-wheel mode when the transfer case is operated in rear wheel drive mode only.

DETAILED DESCRIPTION OF THE INVENTION

Figure 1:
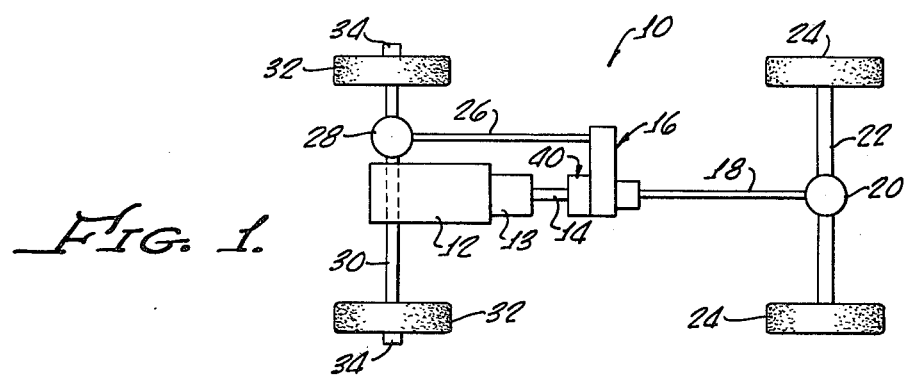
FIG. 1 is a schematic of the power train of a four-wheel drive vehicle.

FIG. 1 shows a schematic of the power train of a four-wheel drive vehicle 10 including an engine 12, a transmission 13, and a main drive shaft 14 connecting to a transfer case 16. The transfer case distributes power through rear drive shaft 18 and rear differential 20 to the rear axle and wheels 22 and 24, respectively. The transfer case 16 also distributes power through forward drive shaft 26 and forward differential 28 to the front axle and wheels 30 and 32, respectively.

FIG. 1 also shows locking-unlocking hubs 34 on the front wheels 32 of the vehicle, which hubs may be used in accordance with the present invention as hereinafter described.

Figure 2:
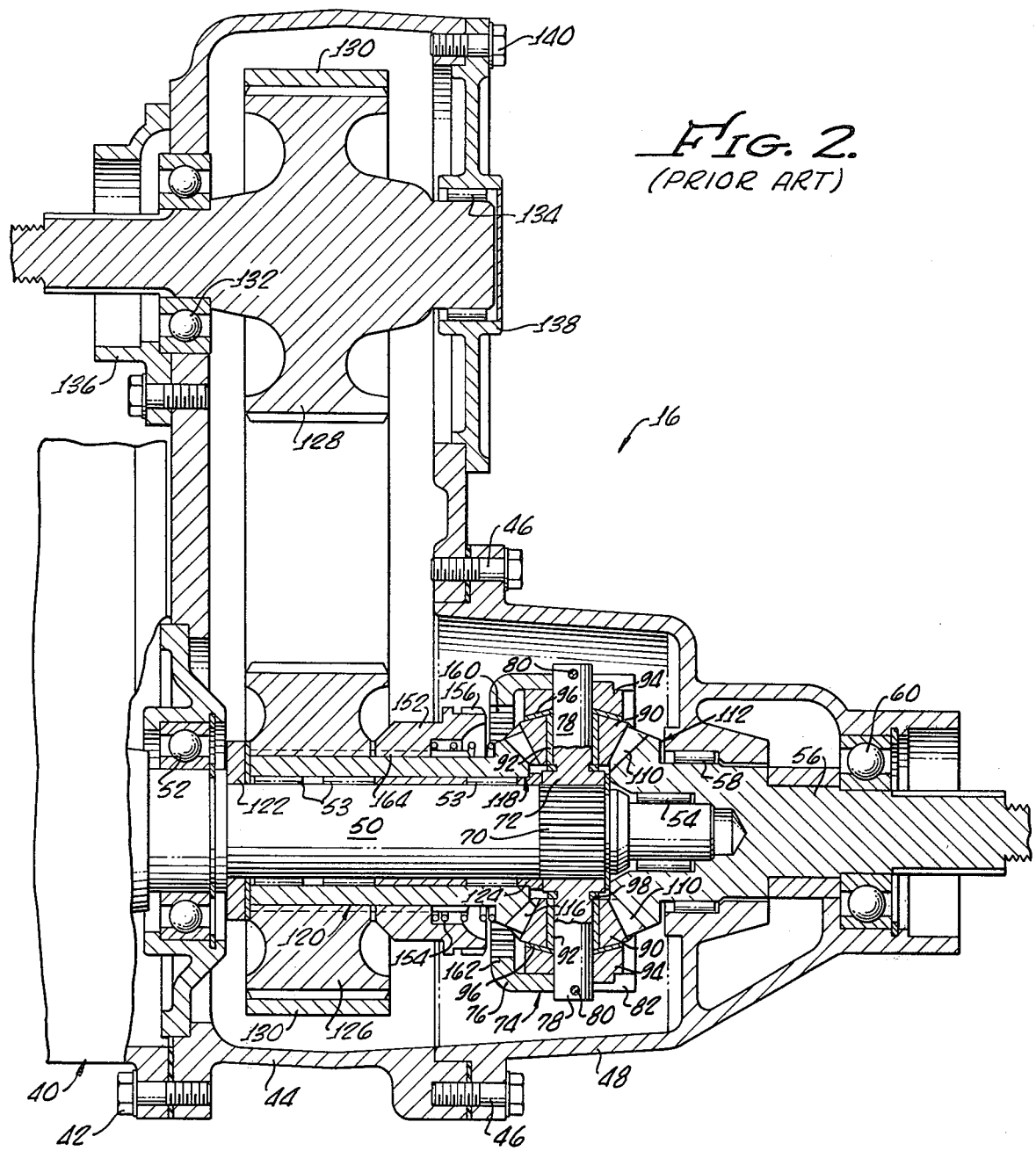
FIG. 2 is a cross-section through a transfer case constructed in accordance with the prior art, which is suitable for modifying or retrofitting in accordance with this invention.

FIG. 2 shows a typical prior art transfer case 16, substantially as shown in U.S. Pat. No. 3,848,691 to Dolan. Substantially similar transfer cases are known in the industry as "New Process 203" transfer cases.

FIG. 2 does not show all the details of the gear reduction unit 40, which is used for selecting between high and low range drive gears, as shown in the above-mentioned patent, since the gear reduction unit is only peripheral to the instant invention (which may be used equally with either a high or low drive range gear ratio). The reduction unit 40 is shown in FIG. 2, in fragmentary form, fastened by bolts 42 to the main transfer case housing 44. Bolts 46 fasten the transfer case tail housing 48 to the main transfer case housing 44.

The main transfer case drive shaft 50, which is powered by the main vehicle drive shaft 14 from the transmission, is mounted in bearings 52 at the forward end, bearings 53 in the mid portion and in bearings 54 at the rear of shaft 50. The bearings 54 nest in rear output shaft 56, which is mounted in bearings 58 and 60, respectively.

The main transfer case drive shaft 50 is secured by splines 70 to the inner ring 72 of carrying cage 74, which houses various differential gears of the transfer case. The carrying cage 74 includes an outer ring 76, which is connected to the inner ring 72 by pinion gear shafts 78 and pins 80. The detailed appearance of the cage 74 can be better observed in FIG. 5. It will be appreciated that there are, of course, other alternative forms of cages. For example, some use two halves which fit around the pinion gear shafts to completely enclose the shafts circumferentially. However, the particular embodiment shown in the drawings has slots 82 for ease of assembly and disassembly.

Four planetary bevel gears or pinion gears 90 are positioned on the four pinion gear shafts 78. (See FIGS. 2 and 4.) Pinion bearing means 92, together with the pinion outer retainers 94 and washers 96 and the inner pinion retainers 98, permit the four pinion gears 90 to rotate freely about the pinion gear shafts 78, but prevent any substantial axial movement or slippage.

When the transfer case is fully assembled, as shown in FIG. 2, the pinion gears 90 are engaged with the teeth 110 of the rear output gear 112, which is formed unitarily with, or affixed to, rear output shaft 56. The pinion gears are also engaged with the teeth 116 of forward output gear 118 which is also formed unitarily with, or affixed to, forward output shaft 120. The forward output shaft is concentrically mounted about the main transfer case drive shaft 50 by means of bearings 53 and is held in axial position against bearing-retaining means 122, which is mounted against housing 44. A thrust ring 124 is positioned concentrically about shaft 50 abutting forward output shaft 120. The thrust ring, together with bearing-retaining means 122, absorb the axial forces imposed on forward output shaft 120 by the inner ring 72 of the carrying cage 74 and by the various pinion gears 90.

Transfer gear means 126 is splined to forward output shaft 120 so that rotation of shaft 120 produces simultaneous rotation of gear means 126, which in turn drives transfer gear means 128 by means of transfer drive chain 130. The transfer gear means 128 is mounted in bearing means 132 and 134, which are secured to the main transfer case housing 44 by bearing brackets 136 and 138, the latter being secured to the transfer case housing by fasteners 140.

Figure 4:
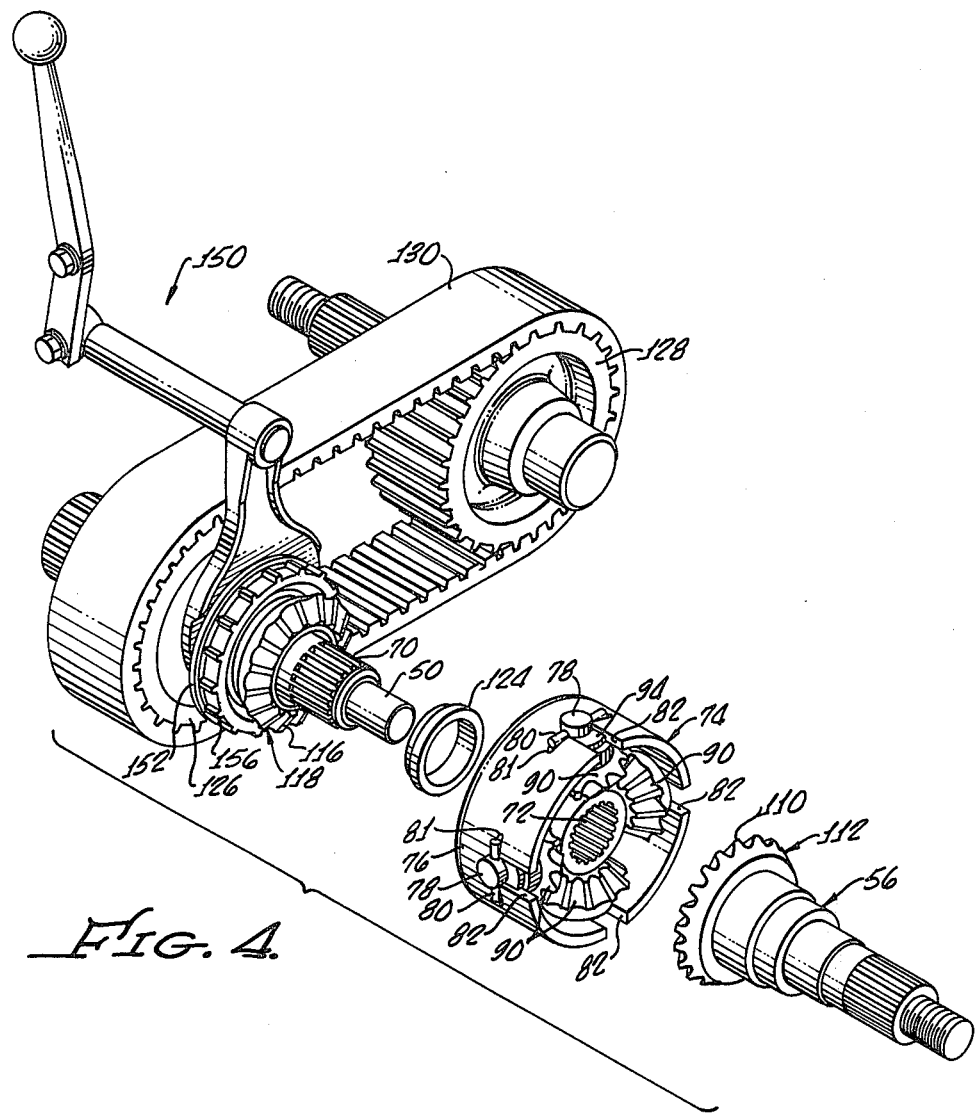
FIG. 4 shows an exploded perspective of a transfer case of the prior art type shown in FIG. 2, illustrating the method of disassembly for modifying the transfer case in accordance with the invention.

When a differential gear that is constructed as shown in FIG. 2 functions, the power output is differentiated between rear output shaft 56 and forward output shaft 120 and thus between rear output shaft 56 and forward drive shaft 26. In a typical transfer case, in order to lock the differential for undifferentiated operation, a shift lever and yoke means 150, as shown in FIG. 4, is employed to slide a clutch means 152 axially against spring 154 until the clutch teeth 156 engage the teeth 160 of ring gear 162. The ring gear 162 is integrally formed with carrying cage 74. Thus, as carrying cage 74 rotates with the main transfer case drive shaft 50, clutch means 152 simultaneously rotates with it, and since clutch means 152 is rotationally secured along its interior by splines 164 to forward output shaft 120, this results in the locking together of shaft 120, carrying cage 74, pinion gears 90, and rear output gear 112. When all of these components are locked together, they rotate as a unit such that undifferentiated power is delivered to the forward and rear output shafts and thus to the forward and rear axles and wheels.

Figure 5:
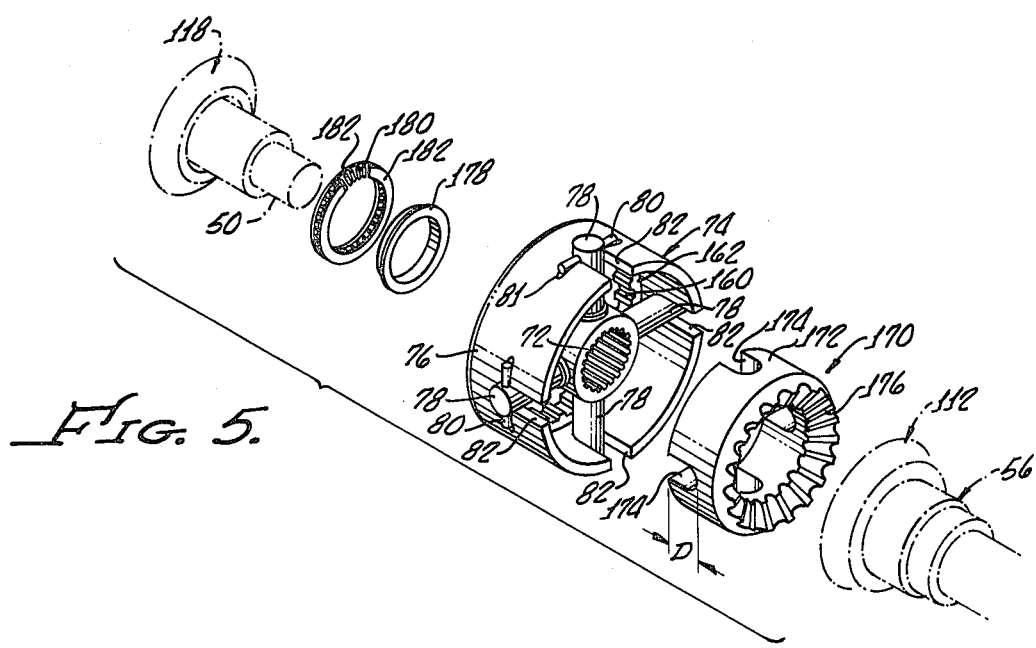
FIG. 5 shows, in exploded perspective, a portion of the transfer case of FIG. 3, after it has been modified.

FIGS. 4 and 5 show the disassembly of the transfer case of FIG. 2 and its modification or retrofitting in accordance with the invention.

Referring specifically to FIG. 4, the disassembly of the transfer case components is achieved by withdrawing the rear output shaft 56 and rear output gear 112 axially away from differential carrying cage 74. The carrying cage 74 is then pulled axially off the splines 70 of main transfer case drive shaft 50 and removed from the unit. The thrust ring 124 may also be removed from about the shaft 50 and replaced as hereinafter described.

After carrying cage 74 has been removed from shaft 50, it is disassembled by removing pins 80, which engage recesses 81 and extend through the ends of the shafts 78. The inner ring 72 of carrying cage 74, together with the pinion gear shafts 78 and the various pinion gears 90, can be removed from the outer ring 76 and further disassembled to remove the outer retainers 94 and the pinion gears 90 from the pinion gear shafts. The inner ring 72, with the pinion gear shafts 78, are then reassembled with outer ring 76 of cage 74, as shown in FIG. 5. The cage is then adapted for receiving a locking means 170, which replaces the various pinion gears previously removed.

The locking means 170 includes a tubular, cylindrical portion 172 which has a radial wall thickness compatibly sized to fit in the annular space between the inner ring 72 and the outer ring 76 of carrying cage 74. Slots 174 in the forward end portion of cylindrical portion 172 are sized to compatibly fit over pinion gear shafts 78. The fit between slots 174 and the pinion gear shafts 78 should be sufficiently snug as to essentially eliminate any significant relative rotational movement between the locking means 170 and the cage 74 when the locking means has been fitted in place. Preferably, no more than about 0.002 inch clearance is provided between the slots 174 and the shafts 78.

Teeth 176 are provided in the rear end portion of locking means 170. The teeth 176 are designed to mesh compatibly with the teeth of rear output gear 112 when the transfer case is reassembled.

In a preferred embodiment of the invention, a replacement thrust ring 178 and a thrust bearing 180 sandwiched between spacers 182 are provided for installation about shaft 50 before the carrying cage 74 is reinstalled on the shaft. The net positioning effect of the various replacement parts depends upon the thickness of thrust ring 178, thrust bearing 180 and the number and thickness of the spacers 182 that are used, together with the depth D of the slots 174 in locking means 170. (Shims, not shown, may also be added or removed from shaft 56 to perfect the positioning.)

Preferably, the total thickness of thrust ring 178, thrust bearing 180, and spacers 182 is sufficient to maintain the carrying cage 74 in substantially the same axial position on shaft 50 as it was in the transfer case prior to modification. This ensures that the clutch means 152 will continue to engage and disengage in the same manner as it did before the retrofitting. The depth D is preferably sufficient to position the teeth 176 of locking means 170 into the teeth of rear output gear 112 with substantially the same axial play as existed prior to removal of the pinion gears. The total axial end play of the output gear optimally ranges from about 0.010 to 0.030 inch. Preferably, the teeth 176 taper conically facing inwardly toward the axis of locking means 170 to mesh with the bevel teeth of gear 112, and engage all the teeth about the full circumference of the gear simultaneously. This provides for a much stronger and more durable engagement than that previously provided by the pinion gears.

Figure 3:
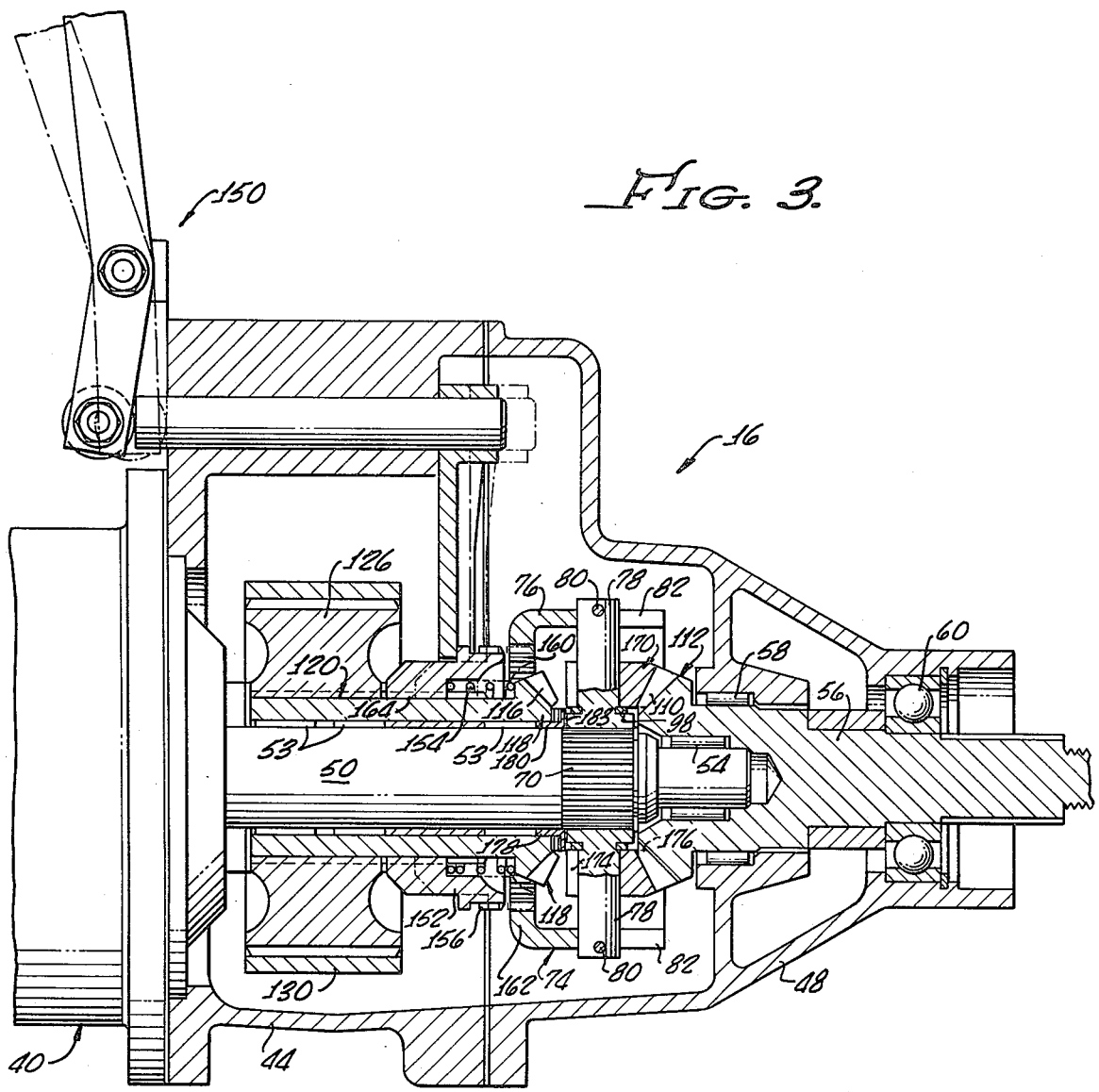
FIG. 3 shows a portion of the transfer case of FIG. 2 after it has been modified in accordance with this invention for optional, part-time two-wheel drive operation.

FIG. 3 shows the retrofitted or modified transfer case after it has been reassembled. In contrast to the assembly shown in FIG. 2, which has only two modes of operation (a differential four-wheel drive mode and a locked four-wheel drive mode), the modified transfer case of FIG. 3 can provide two-wheel drive operation, as well as the four-wheel locked mode of operation. Thus, under normal highway driving conditions where no power transfer to the front wheels is desired, the modified transfer case can be used for two-wheel drive only. In such mode, the shift lever and yoke means 150 and the clutch means 152 are positioned as shown in solid lines in FIG. 3. Therein, it can be seen that when the main transfer case drive shaft 50 is rotated, it rotates carrying cage 74 and locking means 170 mounted therein, as a unit. The locking means 170 is engaged with the teeth of rear output gear 112 so that any rotation of main transfer case drive shaft 50 produces a simultaneous corresponding rotation of rear output shaft 56 to drive the rear axle and wheels of the vehicle.

With the shift lever and yoke means 150 and clutch 152 in the position shown in solid lines, the clutch is disengaged from the teeth 160 of ring gear 162 and, thus, no rotation is imparted to forward output shaft 120, since shaft 50 can freely rotate within shaft 120, and since forward output gear 118 is not engaged with any of the components of the modified differential gears (the pinion gears having been removed).

Since forward output shaft 120 is not driven when the transfer case is in the two-wheel drive mode, it follows that no power is transmitted to the forward output shaft to the front wheels.

For offroad driving, the modified transfer case, as shown in FIG. 3, can be positioned in four-wheel locked mode by positioning the shift lever and yoke means 150 and the clutch means 152 to the position shown in broken lines. In that position it can be seen that the teeth 156 of clutch means 152 will engage the teeth 160 of ring gear 162 and, thus, lock the forward output shaft 120 to the carrying cage 74, as previously described in connection with the operation of the transfer case in FIG. 2. Thus, in four-wheel locked mode the components of the transfer case are locked together so that they move as a unit in precisely the same manner as in the operation of the transfer case prior to modification.

It should be noted that for two-wheel drive operation it is desirable for maximum fuel economy to include in the vehicle modification the installation of locking-unlocking hubs, as shown in FIG. 1. Such hubs can be any of the conventional types that are known in the art and should be used in combination with the transfer case modifications in order to permit free-wheeling of the front wheels when the transfer case is set for two-wheel drive. This prevents the energy waste that would result through the turning of the front axles, differential, forward drive shaft and related gearing if the wheels were not disengaged. Thus, in its preferred embodiment, the invention contemplates modifying the front wheel hubs to include the locking-unlocking hubs, together with the modification of the transfer case to replace the pinion gears and other components with the novel locking means described above.

Figure 6:
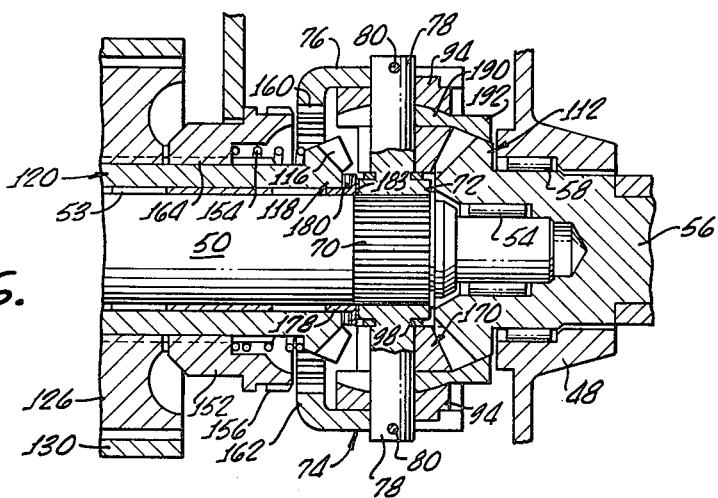
FIG. 6 shows an alternative embodiment of the means for modifying the transfer case.

FIG. 6 shows an alternative embodiment of the locking means of the invention. The arrangement and operation of the main transfer case drive shaft 50, the carrying cage 74, the forward output shaft 120 and the rear output shaft 56, together with the clutch 152, are identical to that described above. However, in the alternative embodiment shown in FIG. 6, the locking means 170 is provided with a generally tubular collar or sleeve 190 which is sized to tightly fit around the periphery of locking means 170 and within the outer ring 76 of carrying cage 74. The outer convex surface of sleeve 190 nests compatibly against the inner concave surface of retainer 94, thus preventing axial movement of the sleeve. The forward lip 192 of sleeve 190 may be machined to engage the rear side of gear 112, as shown, to secure locking means 170 and rear output gear 112 together to prevent any relative axial movement between the two. This embodiment is installed in the same manner as described above, except that the sleeve 190 must be first positioned around shift 56 and engaged with gear 112 and then positioned inside the carrying cage before reassembly can be completed.

Many other uses and variations of the invention will be apparent to those skilled in the art, and while specific embodiments of this invention have been described, these are intended for illustrative purposes only. It is intended that the scope of the invention be limited only by the attached claims.

We claim:

1. An improved means for adapting for optional part-time two-wheel drive operation a full-time four-wheel drive vehicle of the type having forward and rear axles, a transfer case, a main drive shaft operatively connected to the transmission of the vehicle, forward and rear drive shafts operatively connected to said forward and rear axles, the transfer case being of the type having differential gear means including a differential carrier member operatively connected through a transfer case drive shaft to said main drive shaft, pinion gear means rotatably mounted within said carrier member, and forward and rear output drive gears adapted to be engaged with said pinion gear means for being driven thereby, the forward and rear output drive gears being operatively connected by forward and rear output shafts to said forward and rear drive shafts for driving said forward and rear axles respectively, clutch means for optional clutching connection of the differential carrier member to the forward output shaft, the differential carrier member being of the type having a generally tubular inner connecting member adapted for affixing about said transfer case drive shaft, an outer tubular member concentrically disposed about said inner connecting member, elongated cylindrical shaft means extending radially through the annular space between said inner and outer members connecting them and affixing them in said concentric relationship, the pinion gear means being rotatably mounted on said shaft means, said improved means comprising:

means for replacing said pinion gear means and for simultaneously engaging and locking rotationally together said differential carrier member and said rear output drive gear, whereby when said differential carrier member is rotated by said transfer case drive shaft the rear output drive gear is rotated simultaneously and nondifferentially therewith, said replacing means comprising:
a substantially tubular body portion compatibly sized to fit within said annular space when said pinion gear means is removed therefrom, engaging means along one end of said tubular body portion for engaging said radially extending shaft means when said body portion is positioned in said annular space, and engaging means along the other end of said tubular body portion for engaging said rear output drive gear for locking said tubular body portion therewith.

2. The improved means recited in claim 1 further comprising thrust bearing means for positioning about said transfer case drive shaft interposed between said inner connecting member and said forward output shaft for bearing axial thrust forces therebetween.

3. The improved means recited in claim 1 further comprising means for unlocking the front hubs of said vehicle to permit optional free-wheeling of the front wheels.

4. The improved means recited in claim 1 wherein said means for replacing the pinion gear means includes means for preventing relative axial movement between said tubular body portion and said rear output drive gear.

5. The improved means recited in claim 4 wherein said means for preventing relative axial movement comprises sleeve means having:
a forward portion secured around the circumference of said tubular body portion,
a rear lip portion having an internal diameter smaller than said rear output drive gear for engaging the rear side of said gear when said transfer case is assembled, and
a mid portion connecting said forward portion and said rear lip portion, said mid portion having an internal diameter sized to extend over said rear output drive gear,
whereby said sleeve means permits the engaging means along said other end of said tubular body portion to engage the forward side of said rear output drive gear and substantially prevent axial disengagement thereof.

6. The improved means recited in claim 1 wherein said rear output drive gear comprises bevel gear means having teeth on the forward side thereof running substantially radially outwardly from said rear output drive shaft and said other end of said tubular body portion includes a conically tapered gear teeth portion which faces inwardly toward the axis of said tubular body portion for compatible meshing with said teeth of said bevel gear means.

7. The improved means recited in claim 6 wherein there is included means for limiting axial end play from about 0.010 to about 0.030 inch between said rear output drive gear and said tubular body portion when said transfer case is fully assembled.

8. The improved means of claim 1 wherein the engaging means along said one end of said tubular body portion comprises axially aligned slots in said body portion sized to compatibly engage said shaft means.

9. The improved means recited in claim 8 wherein said slots are sized to permit up to about 0.002 inch clearance between the sides of said slots and said shaft means when the slots are engaged therewith.

10. An improved means for adapting for optional part-time two-wheel drive operation a full-time four-wheel drive vehicle of the type having forward and rear axles, a transfer case, a main drive shaft operatively connected to the transmission of the vehicle, forward and rear drive shafts operatively connected to said forward and rear axles, the transfer case being of the type having differential gear means including a differential carrier member operatively connected through a transfer case drive shaft to said main drive shaft, pinion gear means rotatably mounted within said carrier member, and forward and rear output drive gears adapted to be engaged with said pinion gear means for being driven thereby, the forward and rear output drive gears being operatively connected by forward and rear output shafts to said forward and rear drive shafts for driving said forward and rear axles, respectively, said rear output drive gear comprising bevel gear means having teeth on the forward side thereof running substantially radially outwardly from said rear output shaft, said differential carrier member being of the type having a generally tubular inner connecting member adapted for affixing about said transfer case drive shaft, an outer tubular member concentrically disposed about said inner connecting member, elongated cylindrical shaft means extending radially through the annular space between said inner and outer members connecting them and affixing them in said concentric relationship, said improved means comprising:
means for replacing said pinion gear means comprising a substantially tubular body portion compatibly sized to fit within said annular space when said pinion gear means is removed therefrom, engaging means along one end of said tubular body portion for engaging said radially extending shaft means when said body portion is positioned in said annular space, and engaging means along the other end of said tubular body portion for engaging said rear output drive gear for locking said tubular body portion therewith, said engaging means along said other end of said tubular body portion including a conically tapered gear teeth portion which faces inwardly toward the axis of said tubular body portion for compatible meshing with said teeth of said rear bevel gear means, said engaging means along said one end of said tubular body portion comprising axially aligned slots in said body portion sized to compatibly engage said shaft means, thrust bearing means for positioning about said transfer case drive shaft interposed between said inner connecting member and said forward output shaft for bearing axial thrust forces therebetween, and means for locking and unlocking the front hubs of said vehicle to permit optional free-wheeling of the front wheels thereof.

11. An article of manufacture for rotationally locking the pinion gear shafts of a differential gear carrier with the pinion gears removed to an output gear comprising a rigid tubular member having:

at least one pair of diametrically opposed elongated slots at one end, said slots being adapted to engage said pinion gear shafts for substantially preventing relative rotational movement between said carrier and said tubular member and relative axial movement therebetween in at least one direction, and a gear face portion at the opposite end of said member, said gear face portion facing generally axially away from said tubular member and having gear teeth-shaped protrusions around at least a substantial portion of the periphery of said opposite end, said protrusions being adapted to engage said output gear for substantially preventing relative rotational movement between said tubular member and said pinion gear shaft and relative axial movement therebetween in at least one direction.

12. The article of claim 11 wherein each of said slots has a length at least as large as the diameter of said shafts and a width up to about 0.002 inch larger than said diameter.

13. The article of claim 12 wherein there are included two pairs of slots, each pair centered on diametrical axes through said tubular member, the diametrical axis through one pair being perpendicular to the diametrical axis through the other pair and wherein said gear face portion has gear teeth-shaped protrusions uniformly disposed around the entire periphery of said other end, said protrusions being disposed to engage substantially all the teeth of said output gear when said article is operatively assembled in said differential carrier.

14. The method for adapting for optional part-time two-wheel drive operation a full time four-wheel drive vehicle of the type having forward and rear axles, a transfer case, a main drive shaft operatively connected to the transmission of the vehicle, forward and rear drive shafts operatively connected to said forward and rear axles, the transfer case being of the type having a differential carrier member operatively connected through a transfer case drive shaft to said main drive shaft, the differential carrier member having a generally tubular interconnecting member affixed about said transfer case drive shaft, an outer tubular member concentrically disposed about said interconnecting member with an annular space therebetween, shaft means extending radially through the annular space between said inner and outer members connecting them and affixing them in said concentric relationship, and differential pinion gear means rotatably mounted on said shaft means, forward and rear output drive gears engaged with said pinion gear means for being driven thereby, the forward and rear outward drive gears being operatively connected by forward and rear output shafts to said forward and rear drive shafts for driving said forward and rear axles respectively, and clutch means for optional clutching connection of the differential carrier member to the forward output shaft, comprising:

removing said pinion gear means from said shaft means, interconnecting said differential carrier member and said rear output drive gear with a locking member having means at one end thereof engaging said shaft means, and gear teeth at the opposite end thereof meshing with said rear output drive gear, for thereby locking rotationally together said differential carrier and said rear output drive gear, and installing locking-unlocking hubs on the front wheels of said vehicle to permit optional free-wheeling of said front wheels.

15. The method for adapting for optional part-time two-wheel drive operation a full time four-wheel drive vehicle of the type having forward and rear axles, a transfer case, a main drive shaft operatively connected to the transmission of the vehicle, forward and rear drive shafts operatively connected to said forward and rear axles, the transfer case being of the type having a differential carrier member operatively connected through a transfer case drive shaft to said main drive shaft, the differential carrier member having a generally tubular interconnecting member affixed about said transfer case drive shaft, an outer tubular member concentrically disposed about said interconnecting member with an annular space therebetween, shaft means extending radially through the annular space between said inner and outer members connecting them and affixing them in said concentric relationship, and differential pinion gear means rotatably mounted on said shaft means, forward and rear output drive gears engaged with said pinion gear means for being driven thereby, the forward and rear output drive gears being operatively connected by forward and rear output shafts to said forward and rear shafts for driving said forward and rear axles respectively, and clutch means for optional clutching connection of the differential carrier member to the forward output shaft, comprising:

removing said generally tubular interconnecting member from said transfer case drive shaft, separating said generally tubular interconnecting member, said shaft means and said pinion gear means from said outer tubular member, removing said pinion gear means from said shaft means, so that there is no driving connection between said forward and rear output drive gears, reassembling said generally tubular interconnecting member and said shaft means with said outer tubular member, forming a locking member having slots in one end thereof and teeth in the opposite end thereof which taper conically toward the axis of said locking member, then positioning said locking member with the teeth thereof meshing with said rear output drive gear and said shaft means received in said slots, for thereby locking rotationally together said differential carrier and said rear output drive gear, and installing locking-unlocking hubs on the front wheels of said vehicle to permit optional free-wheeling of said front wheels.

* * * * *